R. TOLCHIN.
EAR STUD FASTENER.
APPLICATION FILED MAR. 8, 1913.
1,080,735.
Patented Dec. 9, 1913.
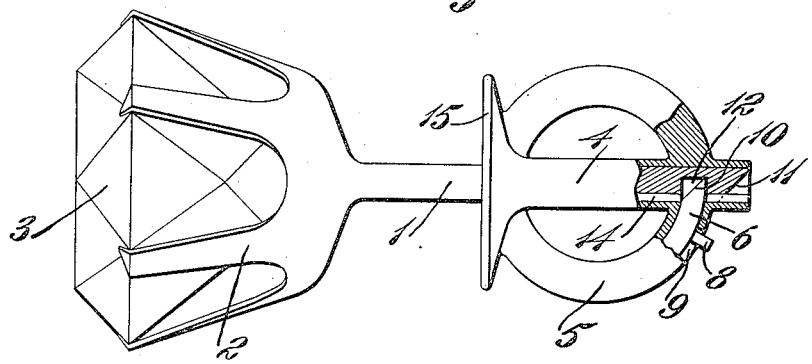
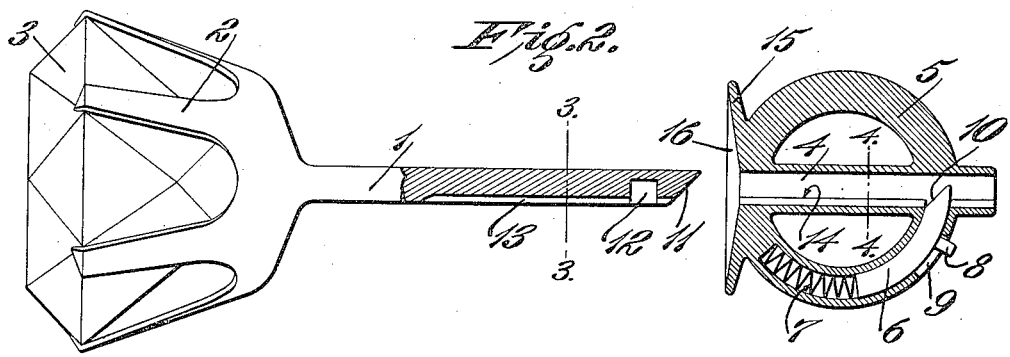
Witnesses:
Edgar S. Farmer
G. A. Pennington
Inventor:
Ruby Tolchin
By Cannet
his Attys.

UNITED STATES PATENT OFFICE.

RUBY TOLCHIN, OF ST. LOUIS, MISSOURI.

EAR-STUD FASTENER.

1,080,735.  Specification of Letters Patent.  Patented Dec. 9, 1913.

Application filed March 8, 1913. Serial No. 752,919.

*To all whom it may concern:*

Be it known that I, RUBY TOLCHIN, a subject of the Czar of Russia, and now residing in the city of St. Louis and State of Missouri, have invented a new and useful Improvement in Ear-Stud Fasteners, of which the following is a specification.

This invention relates to jewelry and more particularly to ear stud fasteners.

It has for its principal objects to produce a simple, compact and efficient securing device which can be readily applied and detached and will not accidentally work loose, and to obviate the disadvantages of the ordinary screw fasteners for ear-piercing studs.

The invention consists in the parts and in the arrangements and combinations of parts hereinafter described and claimed.

In the accompanying drawing, which forms part of this specification and wherein like symbols refer to like parts wherever they occur,—Figure 1 is a side view partly in section, on a considerably enlarged scale, illustrating an ear stud with a securing device applied embodying the invention; Fig. 2 is a similar view, the securing device being detached; Fig. 3 is a section on the line 3—3 of Fig. 2; Fig. 4 is a section on the line 4—4 of Fig. 2; and Figs. 5 and 6 are sections similar to Figs. 3 and 4 illustrating a modification of the invention.

The stud 1 may be provided with any ordinary or desirable mounting 2 for the stone 3. The stud is adapted to receive a fastener comprising a tubular portion 4 which extends diametrically through a circular handle portion 5. One half of this circular portion is tubular and has a curved latch pin 6 slidably fitted therein. Behind the latch pin is a spring 7, which yieldingly holds it in projected position, which position is limited by a stud 8 working in a slot 9 in said circular handle portion and serving as a catch for withdrawing the latch pin. The end of the latch pin is beveled, as at 10, and the end of the ear stud 1 is preferably beveled, as at 11, so as to engage said beveled portion of the latch pin and move the pin back against the spring when the fastener is applied.

The stud may be provided with a recess 12 or perforated all the way through, as desired, so as to receive the end of the latch pin 6; and to facilitate the proper positioning of the holder with respect to the stud so that the beveled end portion 11 of the stud will coöperate properly with the beveled end portion 10 of the latch pin 6, the stud may be grooved longitudinally, as at 13, and the tube 4 provided with a rib 14 which is a counterpart of the groove. In this way it is impossible to apply the fastener without first bringing the stud and fastener in proper position for the rib 14 to enter the groove 13.

The fastener is preferably provided with an annular collar or plate portion 15 which is dished slightly, as at 16, so that the end of the stud 1 may be readily guided to the tube 4, and said collar 15 also affords a comfortable bearing behind the ear. The circular portion 5 affords a convenient grasping piece for manipulating the fastener; and by having a part of said circular portion formed tubular, so as to house the latch pin 6, the device is obviously made compact and yet considerable length is allowed to the latch pin and the spring.

Instead of grooving the stud 1 and providing a rib in the tube 4, the stud may be flattened on one side, as at 17, and the tube correspondingly flattened, as at 18, to insure the proper application of the fastener; and, obviously, the cross section of the stud and tube may be shaped otherwise to accomplish the same result. Therefore, I do not wish to be limited to the exact construction and arrangement shown.

What I claim is:

1. The combination with an ear stud, of a detachable fastener therefor, said fastener comprising a tubular member sleeved on said stud, said stud and tubular member having counterpart coöperating portions arranged so that they fit only when placed endwise in one particular relation to each other and whereby they are permitted relative longitudinal movement but are prevented from turning independently of each other when assembled, an arcuate tubular member secured at its opposite ends to said first-mentioned tubular member and opening at one end into said first-mentioned tubular member, and a correspondingly curved spring-pressed latch pin working in said arcuate tubular member so as to normally project transversely into said first-mentioned tubular member, said ear stud having a transverse opening adapted to receive the end of said latch pin.

2. The combination with an ear stud, of a detachable fastener therefor, said fastener comprising a tubular member sleeved on said stud, said stud and tubular member being relatively grooved and ribbed longitudinally on one side so that they fit only when placed endwise in one particular relation to each other and whereby they are permitted relative longitudinal movement but are prevented from turning independently of each other when assembled, an arcuate tubular member secured at its opposite ends to said first-mentioned tubular member and opening at one end into said first-mentioned tubular member, and a correspondingly curved spring-pressed latch pin working in said arcuate tubular member so as to normally project transversely into said first-mentioned tubular member, said ear stud having a transverse opening adapted to receive the end of said latch pin.

3. The combination with an ear stud, of a detachable fastener therefor, said fastener comprising an integral structure including a tubular member, two semi-circular members merging at their ends with said tubular member on opposite sides thereof, a collar at the inner end of said tubular member and merging with the adjacent ends of said semi-circular members, said tubular member being sleeved on said ear stud, said stud and tubular member having counterpart coöperating portions arranged so that they fit only when placed endwise in one particular relation to each other and whereby they are permitted relative longitudinal movement but are prevented from turning independently of each other when assembled, one of said semi-circular members being tubular and opening at one end into said first-mentioned tubular member near the outer end thereof, and a spring-pressed arcuate latch pin working in the tubular portion of said semi-circular member so as to normally project transversely into said first-mentioned tubular member, said ear stud having a transverse opening adapted to receive the end of said latch pin.

Signed at St. Louis, Missouri, this 27th day of February, 1913.

RUBY TOLCHIN.

Witnesses:
G. A. PENNINGTON,
ANDREW P. KESSLING.

---

Copies of this patent may be obtained for five cents each, by addressing the "Commissioner of Patents, Washington, D. C."